Figure 1:
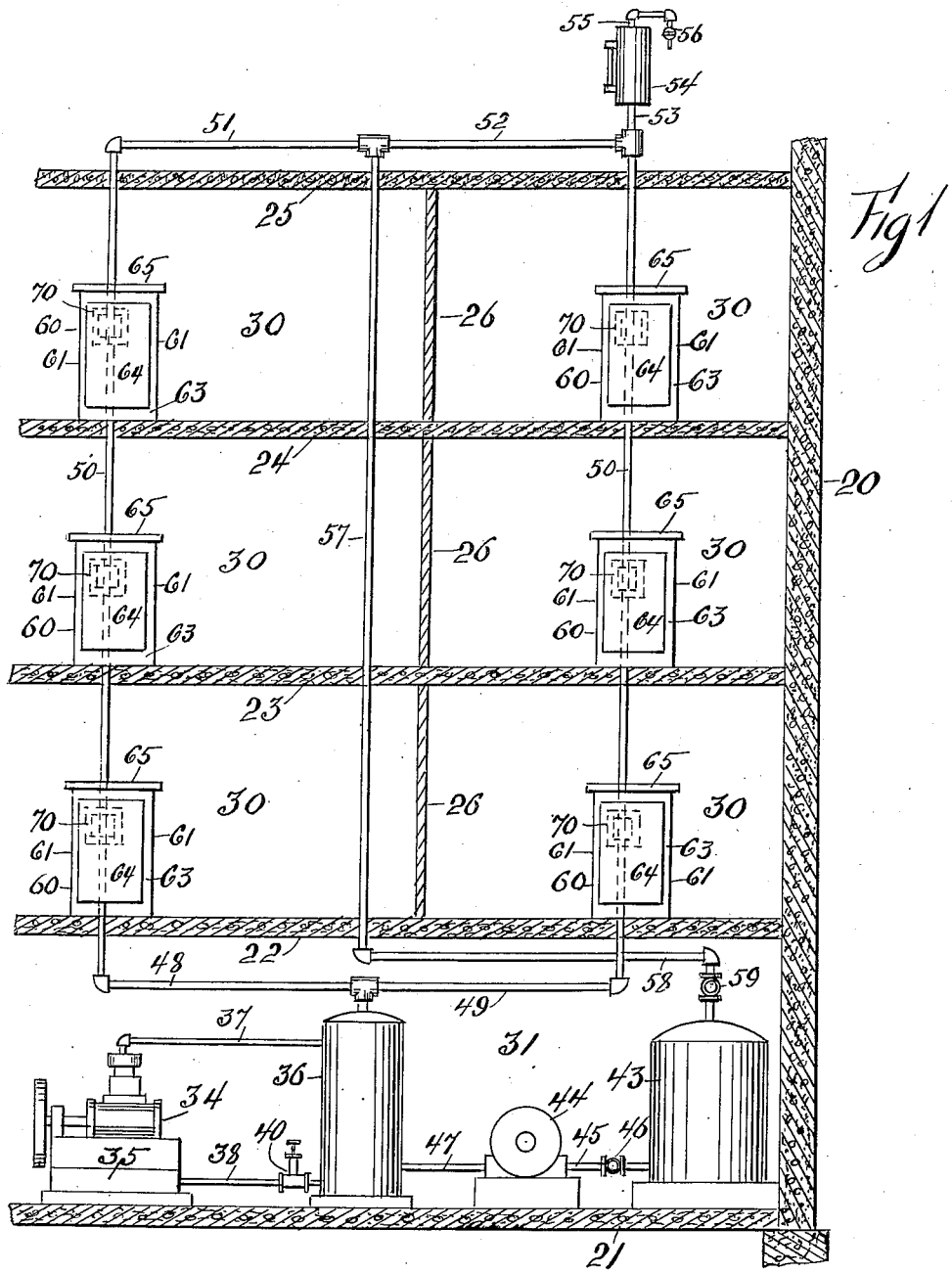

Dec. 1, 1931.  J. G. LAPHAM  1,834,459
FREEZING UNIT
Original Filed Jan. 30, 1929  2 Sheets-Sheet 1

Inventor
John G. Lapham
By his Attorney
A N de Romeville

Dec. 1, 1931.　　　J. G. LAPHAM　　　1,834,459
FREEZING UNIT
Original Filed Jan. 30, 1929　　2 Sheets-Sheet 2
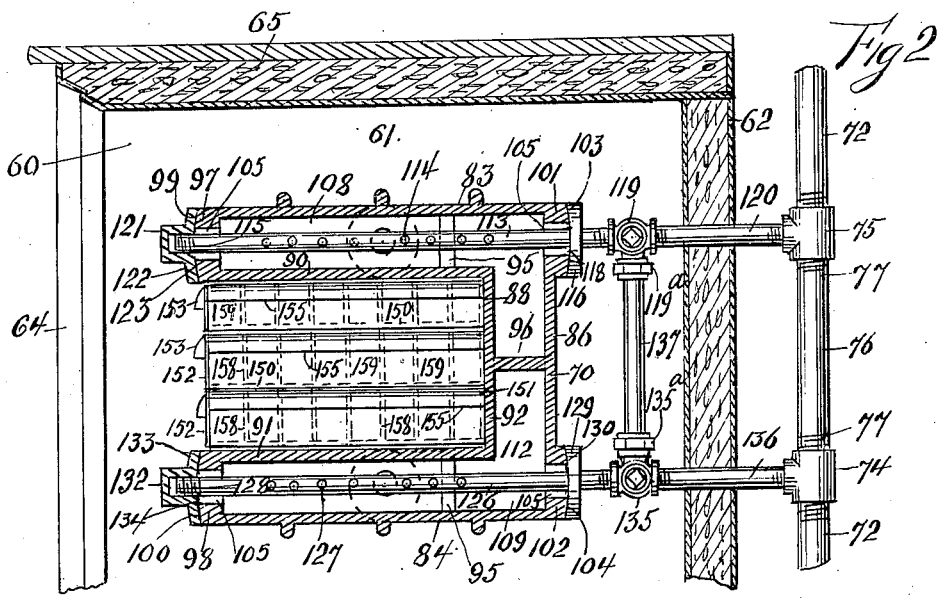
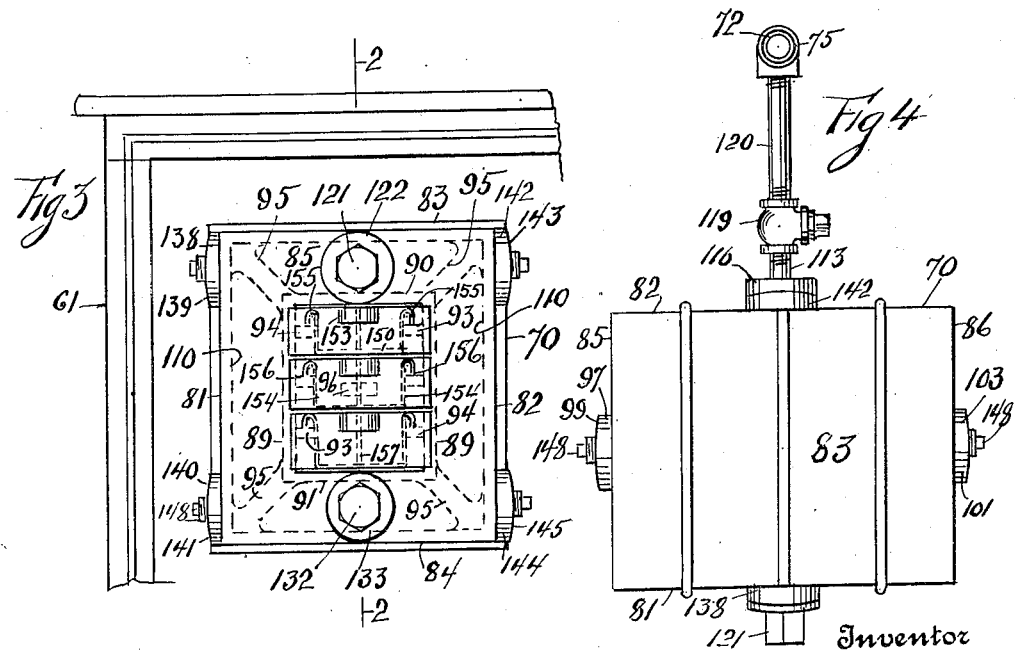
Inventor
John G. Lapham
By his Attorney
A. A. de Romeville Patented Dec. 1, 1931

1,834,459

UNITED STATES PATENT OFFICE

JOHN G. LAPHAM, OF NEW YORK, N. Y.

FREEZING UNIT

Application filed January 30, 1929, Serial No. 336,095. Renewed May 4, 1931.

This invention relates to a freezing unit.

The object of the invention is the production of a freezing unit, which can be easily installed and connected to the piping therefor. The second object of the invention is the production of a freezing unit, which can be easily connected to the piping of the cooling or freezing agent used therewith, when said piping is not accurately located in place. The third object of the invention is the production of freezing units, which are specially adapted to be installed in ice boxes or refrigerators of cooling and refrigerating systems in hotels, apartment houses, business establishments and the like. Other objects of the invention will be apparent from the accompanying drawings, description and claims.

In the accompanying drawings Figure 1 represents a building in sectional elevation, with a refrigerating system having a plurality of the improved freezing units incorporated therein; Figure 2 shows a section of a refrigerator on an enlarged scale and a section of one of the freezing units as on the line 2, 2 of Figure 3 and the appurtenances of the latter; Figure 3 indicates a left hand side view of Figure 2 and Figure 4 shows a top view of the freezing unit with a modification in its pipe connections.

Referring to Figure 1 a building is indicated to comprise the vertical wall 20, the cellar floor 21, the upper floors 22, 23, 24 and 25, and the partitions 26, forming a plurality of rooms 30, and the cellar 31.

A compressor 34 having a condenser not shown is indicated with its liquid receiver 35. The latter is connected to the brine cooler 36 by means of the pipes 37 and 38. The pipe 38 has connected thereto the expansion valve 40. A brine tank is indicated at 43 and a brine pump is shown at 44. Piping 45 with the valve 46 connects the brine tank 43 and the pump 44, and piping 47 connects the said pump and the cooler 36. Horizontal piping having the members 48 and 49 extends from the cooler 36. Risers indicated in their intireties at 50 extend from the members 48 and 49. The risers 50 at their upper ends are connected by the horizontal members 51 and 52. An extension 53 extends from one of the risers 50 and has connected thereto the balancing tank 54. Air outlet piping 55 with the cock 56 extends from the tank 54. A return pipe 57 extends from the members 51 and 52 and connects with the horizontal pipe 58. A vertical pipe with the valve 59 connects the pipe 58 and the brine tank 43.

Ice boxes or refrigerators indicated in their entireties by the numeral 60, are located in the rooms 30. In each of the boxes 60 is located one of the freezing units indicated in its entirety by the numeral 70. The freezing units 70 are each connected to the risers 50 as will be described in detail.

Each ice box 60 is shown having the side walls 61, the rear wall 62, the front wall 63 having an opening for the door 64 and the top wall 65.

The risers 50 comprise each a plurality of members 72, which are connected by pairs of T's 74 and 75. Between each pair of T's 74 and 75 is interposed a cut out or blank section and stiffening member which comprises a rod 76 having the threaded ends 77. The ends 77 are in threaded engagement with the T's 74 and 75.

Each freezing unit 70 comprises an outer shell having the side walls 81 and 82, the top wall 83, the bottom wall 84, the front wall 85 and the rear wall 86. A freezing chamber 88 is contained in the outer shell and comprises the inner shell having the side walls 89, the top wall 90, the bottom wall 91 and the rear wall 92. Pairs of shelves 93 and 94 extend from the side walls 89. Strengthening ribs 95 and 96 connect the said outer and inner shells of the freezing unit. From the front wall 85 extend the similar projetcions 97, and 98. Said projections have respectively formed therewith the spherical convex surfaces 99 and 100. From the rear wall 86 extend the similar projections 101 and 102. The projection 102 is in line with projection 98. The projections 101 and 102 have respectively formed therewith the spherical convex surfaces 103 and 104. The projections 97 and 101 are axially in line and cylindrical openings 105 are made in each of said projections.

Between the said outer and inner shells of the freezing unit are formed the upper brine chamber 108, the lower brine chamber 109, the side brine chambers 110 and the rear brine chamber 112.

An outlet pipe 113 having the inlet openings 114, and the threaded end 115 extends through the chamber 108, and through the openings 105 of the projections 97 and 101. A flange 116 having the spherical concave surface 118 is fastened to the pipe 113. The surfaces 103 and 118 are of the same radius and when they bear against each other form a tight joint.

The pipe 113 has connected thereto the three way cock 119 having the union 119$^a$. The cock 119 is connected to the T 75, by means of the pipe 120. A cap nut 121, having a flange 122 with the spherical concave surface 123 is in threaded engagement with the threaded end 115 of the pipe 113. The surfaces 99 and 123 are of the same radii, and when they bear against each other form a tight joint.

An inlet pipe 126 similar to 113, having the outlet openings 127 and the threaded end 128, extends through the chamber 109 and then through the openings 105 of the projections 98 and 102. A flange 129 having the spherical concaved surface 130 extends from the pipe 126. The surfaces 130 and 104 are of the same radius, and when they bear against each other form a tight joint. A cap nut 132 having the flange 133 with the spherical concave surface 134 is in threaded engagement with the threaded end 128 of the pipe 126. The surfaces 100 and 134 are of the same radius and when they bear against each other form a tight joint. A three way cock 135 having the union 135$^a$ is connected to the pipe 126 and said cock 135 is also connected to the T 74 by the pipe 136. A pipe 137 connects the unions 119$^a$ and 135$^a$. A projection 138 having the spherical convex surface 139 extends from the upper portion of the side wall 81, and a similar projection 140 having the spherical convex surface 141 extends from the lower portion of said wall 81. A projection 142 axially in line with the projection 138 and having the spherical convex surface 143 extends from the upper portion of the wall 82 and a similar projection 144 having the spherical convex surface 145 extends from the lower portion of the wall 82. The projections 140 and 144 are axially in line with each other. Screw plugs 148 are in threaded engagement with openings in the projections, 138, 140, 142 and 144 when the piping for the freezing unit is connected thereto as indicated in Figures 1 and 2.

The piping for the freezing unit may be connected to the side walls 81 and 82, instead of to the front or rear walls thereof and to which they are perpendicular as indicated in Figure 4. In the latter figure the pipe 113, having the flange 116 extends through the chamber 108 and through the openings of the projections 138 and 142. The cap nut 121 is in threaded engagement with the pipe 113 as already described. The pipe 126, not shown in Figure 4, is connected to the freezing unit and extends through the projections 140 and 144 as described for the pipe 126. In Figure 4 the pipe 113 is again connected to the three way cock 119, and the pipe 120 is again shown connected to the T 75. In Figure 4 the cock 135 and pipe 136, not shown, coact with the pipe 126. It will be noted that the openings 105 extending through the projections are considerably larger in diameter than the pipes 113 and 126, so that the said pipes can extend through the openings 105 in inclined directions. When the freezing unit is connected to its piping as shown in Figure 4, screw plugs 148 are provided for the openings in the projections 97, 101, 98 and 102. On each pair of shelves 93 and 94 is slidably supported a tray, preferably of copper and thoroughly tinned. Each of said trays comprises a bottom wall 150, a rear wall 151, a front wall 152 with the handle 153 and the side walls 154, each with the return bend 155 having the bearing edge 156. The latter bear on their accompanying shelves. Partitions 157 and 158 in each tray form a plurality of chambers 159 open at their top ends. To use the cooling and refrigerating system, the compressor 34 is started and in this instance carbon dioxide gas which flows from the brine cooler 36 through the pipe 37, is compressed in said compressor and then condensed in a condenser, not shown, connected to the compressor. The condensed carbon dioxide then flows into the liquid receiver 35. The liquid carbon dioxide then flows through the pipe 38 and through the expansion valve 40. From the latter the gas formed enters the tubes, not shown, in the brine cooler 36 and from thence enters the pipe 37 on its return to the compressor. Brine in the brine tank 43 is pumped therefrom by the brine pump 44 through the pipe 45. The brine then flows through the pipe 47 and enters the brine cooler 36 on the outside of the tubes thereof where it is cooled. The cooled brine is next forced through the pipe members 48, 49 and enters both of the risers 50 and the members 72 thereof. From the latter the brine enters each freezing unit 70 by way of the pipe 136, three way cock 135 and the pipe 126. The brine is discharged from the pipe 126, through its outlet openings 127 and enters the lower brine chamber 109. It next flows upwardly through the side brine chambers 110 and the rear brine chamber 112. The brine next enters the upper brine chamber 108 and then flows into the pipe 113 through its inlet openings 114. Next the brine flows through the three way cock 119, the pipe 120, the T 75 and then upwardly in the member 72 extending up from the said T 75. The brine then flows through the next above freezing unit as just described.

While the brine is flowing through the freezing units, water or other liquid which has previously been poured in the chambers 159 freezes, and when frozen the tray in the freezing units can be withdrawn and the little cubes of ice formed can be detached from said tray. While said ice cubes are being formed the interior of each of the ice box 60 is cooled, and thereby any food or other material in said ice boxes is cooled.

It will be particularly noted that the spherical surfaces of the projections 97, 98, 101 and 102, and the spherical surfaces of the flanges 116, 129 and of the cap nuts 121 and 132, provide efficient means for tight joints between the freezing units and said flanges and nuts, when the pipes 113 and 126 are not in line with chambers of the units through which they extend. When the cap nuts 121 and 132 are drawn tightly on their pipes 113 and 126 the freezing units are tightly secured in place, irrespective of the fact whether the pipes 113 and 126 are axially in line with the openings 105. The large diameter of the latter permit said pipes to extend through the openings 105 in inclined directions. Gaskets may be interposed between each pair of spherical surfaces of the projections of the freezing unit and their coacting collars and cap nuts. When it is desired to prevent the brine circulating through any of the freezing units the three way cock 119 is turned to make a connection between the pipes 120 and 137 and the three way cock 135 is turned to make a connection between the pipes 136 and 137. With this disposition of the elements the brine from the member 72, flows through the pipes 136 and 137, then flows through the pipe 120, the T 75 and up the next member 72 without entering the freezing unit. The by-pass formed by the three way cocks and the pipe 137 allows the defrosting of any of the freezing units, independent of the operation of the others, and allows repairs to be made without interfering with the functioning of the rest of the system. Various modifications may be made in the invention and the present exemplification is to be taken as illustrative and not limitative thereof.

Having described my invention what I desire to secure by Letters Patent and claim is:

1. In a freezing unit the combination of an outer shell and an inner shell, having chambers between them and said inner shell having a freezing chamber therein, pipes having openings extending through a pair of the walls of the outer shell and means to form a tight joint between said pipes and said walls of the outer shell when said pipes are perpendicular to said walls and when deviating from a right angle thereto.

2. In a freezing unit the combination of an outer shell and an inner shell, having chambers between them for the circulation of a cooling agent, said inner shell having a freezing chamber therein, pairs of projections axially in line extending from the outer shell, each projection having an opening and a spherical surface, a pipe having openings extending through the openings of each pair of projections and said freezing unit, a flange extending from each pipe, each flange having a spherical surface adapted to bear against the spherical surface of one of the projections to form a tight joint therewith, and a nut in threaded engagement with one end of each pipe, said nut having a spherical surface bearing against the spherical surface of a projection adjacent thereto.

3. The combination of a freezing unit having chambers for the circulation of a cooling agent, pipes extending through said chambers and from said unit, said pipes having openings in the chambers for the passage of the cooling agent, a riser for the circulation of the cooling agent adjacent to said unit, said riser comprising a plurality of members, a cut-out between a pair of members opposite the freezing unit, a three way cock connected to each pipe extending from the freezing unit, a pipe connecting each three way cock and one of the members of the riser, a union for each three way cock and a pipe connected to said unions.

4. In a freezing unit the combination of an outer shell, said shell comprising a front wall, a rear wall, side walls, a top wall and a bottom wall, an inner shell within the outer shell, said shells forming chambers between them for the circulation of a cooling agent, a pair of projections extending from said front wall, a pair of projections extending from the rear wall in line with the projections of the front wall, a pair of projections extending from one of said side walls and a pair of projections in line therewith, extending from the other side wall, each projection having an outer spherical surface having an opening therethrough extending through said outer shell, a pipe having openings adapted to extend through the openings of a pair of projections that are in line with each other and extending through the outer shell, a second pipe extending through a second pair of the projections that are in line with each other and extending through the outer shell, a flange having a concaved spherical surface extending from each pipe and bearing against one of said projections to form a tight joint and a nut in threaded engagement with one end of each pipe and bearing against a projection adjacent thereto.

5. The combination of a plurality of freezing units, each freezing unit having chambers for the circulation of a cooling agent, a pair of pipes extending through the chambers of each freezing unit, said pipes having openings in the chambers for the passage of the cooling agent, a riser for the circulation of said cooling agent, connections between said riser and the pipes extending through the chambers of each freezing unit, a by-pass for each freezing unit connected to its connection to by-pass the cooling agent, and prevent its entrance in any of said freezing units and a return pipe in connection with said riser.

Signed at the borough of Manhattan, city of New York, in the county of New York and State of New York, this 28th day of January, A. D. 1929.

JOHN G. LAPHAM.